United States Patent
Chrabieh (10) Patent No.: US 8,166,483 B2
(45) Date of Patent: *Apr. 24, 2012

(54) METHOD AND APPARATUS FOR IMPLEMENTING PRIORITY MANAGEMENT OF COMPUTER OPERATIONS

(76) Inventor: Rabih Chrabieh, San Diego, CA (US)

( * ) Notice: Subject to any disclaimer, the term of this patent is extended or adjusted under 35 U.S.C. 154(b) by 1792 days.

This patent is subject to a terminal disclaimer.

(21) Appl. No.: 11/197,825

(22) Filed: Aug. 5, 2005

(65) Prior Publication Data

US 2006/0031838 A1    Feb. 9, 2006

Related U.S. Application Data

(60) Provisional application No. 60/598,983, filed on Aug. 6, 2004.

(51) Int. Cl.
*G06F 9/46* (2006.01)
*G06F 9/44* (2006.01)

(52) U.S. Cl. ............ 718/103; 717/101; 717/120
(58) Field of Classification Search ............ 718/103
See application file for complete search history.

(56) References Cited

U.S. PATENT DOCUMENTS

| | | | | |
|---|---|---|---|---|
| 5,179,708 A | * | 1/1993 | Gyllstrom et al. | 719/314 |
| 5,519,874 A | * | 5/1996 | Yamagishi et al. | 709/201 |
| 2004/0078780 A1 | * | 4/2004 | Dutt et al. | 717/106 |

* cited by examiner

*Primary Examiner* — Camquy Truong
(74) *Attorney, Agent, or Firm* — Michael D. Eisenberg (57) ABSTRACT

A development framework and runtime environment for applications that execute in real-time operating systems. Application development is enhanced by providing simple instructions that allow a programmer to declare any function as a function managed with priority. Compiler tools implement priority function and the management code for managing execution at runtime. At runtime, priority functions are managed based on their respective priority level. The priority function information is stored when execution is to be delayed.

16 Claims, 6 Drawing Sheets

METHOD AND APPARATUS FOR IMPLEMENTING PRIORITY MANAGEMENT OF COMPUTER OPERATIONS

CROSS-REFERENCES TO RELATED APPLICATIONS

This application claims the benefit of U.S. provisional patent application No. 60/598,983, filed Aug. 6, 2004, and entitled "Compiler Augmented with Priority Functions and Priority Objects," the specification and figures of which are herein incorporated by reference.

FIELD OF THE INVENTION

The invention relates to computer software, and more specifically to software for enabling operating systems and applications to manage real-time operations.

A portion of the disclosure of this patent document contains material which is subject to copyright protection. The copyright owner has no objection to the facsimile reproduction by anyone of the patent document or the patent disclosure, as it appears in the Patent and Trademark Office file or records, but otherwise reserves all copyrights associated with this document.

BACKGROUND

Real-time operating environments enable computers to perform time-constrained functions. Examples of time-constrained functions include executing tasks at regular time intervals (e.g., automatically updating a user interface), running a program at a given time (e.g., reading input from a peripheral for a given period of time), or delaying the execution of a task for a given time period. Any of the latter functions may be triggered, for example, by a timer and/or a software event.

A real-time operating system typically comprises a kernel and a number of applications and drivers. The kernel is the part of the operating system that manages the execution of applications and the inputs and outputs through drivers. A task, in computer code terms, is a piece of code (e.g., computer application or a part thereof) designed to enable the computer to provide a given functionality. Modern real-time operating systems are able to virtually simultaneously execute more than one task by switching from one task to another, an operation that requires sharing execution time in a scheduled manner (conventionally referred as "time-slicing"). The kernel determines, at each time period, the next task to execute/resume. Thus, in existing real-time operating systems, each task must be designed to be able to execute, suspend execution, resume execution, and stop. For instance, a task may need to stop in order to wait for new input, or when it is preempted by another task. The system utilizes a stack to be able to store the state of a task when stopping its execution, and re-establish its state when the execution resumes. Since modern programs typically use a stack to execute function calls, a task needs its own stack in order to run, stop and resume running. For example, in the case of switching from a task "A" to a task "B", the system switches the execution context from task "A" to task "B" by saving the registers of task "A" to stack of "A", then restoring (previously saved) registers of task "B" from stack "B". Furthermore, a task possesses a unique entry point. The entry point comprises a mailbox (or message queue). The mailbox receives messages, and a dispatcher dispatches each message to the appropriate part of the program code within a task once it is invoked.

The purpose of a task-based architecture in real-time operating systems is the ability to handle time-sensitive tasks, thus the need to switch between multiple tasks on the basis of each task's priority level. The priority level allows the real-time operating system to determine which task is to be executed at any time slice or following an interrupt. For instance, a low priority task can run the main algorithms, while a higher priority task can execute time sensitive code. The high priority task preempts the low priority task at almost any point in time.

Existing real-time operating systems present many limitations with regard to task management. For a software engineer, developing programs for a real-time operating system is a time-consuming and error prone endeavor. A programmer must manually assign priority levels and create messages for communications between different tasks. For example, if a function "F" runs in task "A", it is impossible to call it from task "B" in existing systems. The way to call function "F" is by sending a message to task "B", the message containing information regarding which function to call and including the parameters to pass to function "F". In existing real-time operating systems architecture, the developer is compelled to manually assign functions to tasks and write messages to transmit between tasks, which increases development time and reduces the modularity of a program.

Therefore, there is a need for an improved architecture that allows a programmer to automatically implement program management tools in order to facilitate runtime task switching.

SUMMARY OF THE INVENTION

The invention provides a development framework and runtime environment for applications enabled to execute in a real-time operating system. In embodiments of the invention, a program function (e.g., C or C++ function) may be directly assigned a priority level to convert it to a priority function. A priority function, as opposed to the task architecture of existing operating systems, does not require the programmer to provide the detailed instructions for managing the execution of a task. Furthermore, a call to such a priority function may be similar to a call to a regular function. Thus, for a programmer using an embodiment of the invention, writing code for a real-time operating environment is similar to writing code for environments that do not require management of real-time tasks.

In one or more embodiments, along with declarations to create priority functions, a programmer provides declarations to implement priority management features. The compiler converts a function, declared as a priority function, into a function that may be managed by the priority management code. For example, one or more declarations, along with source code for a priority function, indicate to a compiler that a priority function is to be associated with a scheduler, a memory manager, a database manager and other components that allow a system to run a priority function. Simple declarations for implementing priority management of computer operation are converted into complete code to support such capabilities. For example, a preprocessor may be enabled to read various declarations a programmer adds to the source code of an application, and automatically integrate source code for managing priorities at runtime.

When invoking a priority function, if the function's priority is above the priority of a currently running function, the former function is called immediately. Otherwise, the priority function request is stored in a database, and the priority function is called when all higher priority functions have terminated. In addition, when a priority function is called, the system does not require a context switch. In prior art systems, switching between tasks at runtime requires that the system saves the state of the running task to a stack, then recover that state when the task is to resume execution.

Embodiments of the invention reduce the amount of coding a developer is required to provide as compared with existing architectures. The invention also provides a runtime environment that reduces the overhead of context switching. Memory space requirements (e.g., stack space) may also be reduced, because most priority functions use a shared stack, as opposed to one stack per task.

DETAILED DESCRIPTION

The present invention provides a method and apparatus for implementing priority management in computer operating systems and applications. A development framework is described for developing applications enabled with real-time task switching and priority management capabilities and enhancing the runtime performance of computer operations.

In the following description, numerous specific details are set forth to provide a more thorough description of the invention. It will be apparent, however, to one skilled in the art, that the invention may be practiced without these specific details. In other instances, well known features have not been described in detail so as not to obscure the invention. The claims following this description are what define the metes and bounds of the invention.

Terminology

The invention is described below in terms of Real Time Operating Systems (real-time operating system), however, the invention is not restricted to Real Time Operating Systems. The general concepts, methods and systems described below may be used to simplify software programming and to enhance runtime performance in any software environment.

In the following description, the terms "developer" and programmer may refer to a person, such as a computer program developer, using a computer application and/or to one or more processes interacting with a computer application or system. A process may be any computer program executing locally or remotely and may be triggered by one or more events. An event is defined as the occurrence of a low-level action (e.g., software or hardware interrupt), a high-level action (e.g., keyboard input from a user), or a combination of actions.

The term "function" in the disclosure may refer in a broad sense to a functionality provided by a software program, and may refer more specifically to a block of computer program code. Depending on the programming language, the block of program code may be called, for example, a routine, subroutine, method or procedure. The disclosure may utilize each meaning of the term "function" in the appropriate context and/or with respect to the convention of the programming language in use.

In the art of computer software development, the term "compiler" may refer to a program for converting code from a high level computer programming language to a low level computer program code. In the process of compiling, the compiler may run several other programs that perform specific steps in the process of generating the code. For example, a compiler may comprise a syntax analyzer, a preprocessor, an interpreter and any other program that may take part in the process of generating code. The disclosure makes use of the term "compiler" as known in the art of computer programming to refer to any and all the components involved in generating the program code from a higher level source code.

The invention may be implemented as a computer program based on a modularized architecture as will be described below. Each component may be implemented as part of a larger infrastructure (e.g., within an application server) or as a plug-in, applet, DLL (dynamic link library), etc. that may be embedded within, or interfaced with third party applications. Though described in modular terms for purposes of illustration, embodiments of the invention need not be confined to a modular structure. For example, parts of the invention may be implemented in a new compiler or a standalone application, or may be embedded in an existing compiler to enhance the latter's capabilities.

The invention described herein is set forth in terms of methods and systems implementing those methods. It will be apparent, however, to one with ordinary skill in the art that the invention may be implemented as computer software, e.g., computer program code capable of being stored in the memory of a digital computer and executed on a microprocessor.

Overview of the Invention

In a multi-tasking computing environment, a system must switch between multiple programs in order to maintain the virtual simultaneity of program execution. In real-time operating systems, for example, the programs are composed of one or more tasks. Each task is a piece of code designed to run, stop, and resume running. For instance, a running program may need to stop and wait for new input.

The task architecture allows a real-time operating system to manage the proper execution of programs. Each task is assigned a priority level, and is associated with a stack. A first task may be preempted by a second task with higher priority, for example, which requires the system to momentarily stop the first task. The system uses the stack to preserve the state of the first task when the task stops. As described above (see the Background section), when task A stops and task B resumes, a "context switch" occurs. In the context switch, the registers of task A are saved to stack A. The registers of task B are restored from stack B.

The purpose of a task architecture is to execute different pieces of code at different priority levels. For instance, a low priority task can run the main algorithms, while a higher priority task can execute time sensitive code. The high priority task preempts the low priority task at (almost) any point in time. Note that hardware interrupts can achieve similar behavior, but they are usually reserved to very time sensitive instructions.

Moreover, other reasons in support of a task architecture are time-slicing, enabling a system to allot a slice of time to each task; multi-processing, where an application is split into several tasks that may run on different processors; and memory protection between different tasks.

With an architecture built around tasks, a program quickly becomes complicated. For example, if a function F runs in task A, it is impossible in existing operating systems to directly call it from a task "B". In existing real-time operating systems the way to call a function "F" is by sending a message to task "B" (containing information on what function to call, and call parameters); stopping task "A"; starting task "B"; dispatching the message within task "B" to the appropriate sub-task; invoking function "F"; stopping task "B" when function "F" is done, and resuming task "A".

When creating applications for existing task-based operating environments, a programmer has to be aware of all the program requirements, such as where a function should run, and what type of messages to send between different tasks and functions. A programmer must, for instance, prepare for each function call a message with all the parameters necessary for a function call, store the message in a mailbox that corresponds to a task. When the task is invoked, the message is then dispatched to the appropriate function within the task.

Embodiments of the invention provide a framework in which any type of program code may be assigned a priority level, thus allowing a system embodying the invention to directly invoke the program code or any subdivisions thereof. For example, an embodiment of the invention may implement a "priority function." A priority function has an assigned priority level, and may be directly invoked like other known types of functions in the art of software programming. The execution priority level of a priority function may be managed in a similar fashion to real-time operating system tasks. In its simplest form, a "priority function" may be a regular function to which a priority level is assigned. In one or more embodiments, a scheduler is invoked to execute "priority functions" at the appropriate priority levels.

Embodiments of the invention may provide a language compiler, interpreter and/or preprocessor to implement priority functions. The latter compiler makes the implementation straightforward, by automatically handling priority functions. As such, the job of a real time programmer is simplified. Furthermore, simulation code can be relatively quickly turned into real time embedded software.

Using an embodiment of the invention, a programmer may not need to declare function arguments inside message structures, or program messages between tasks as is the case of tasks in existing real-time operating systems. The programmer may simply add a few directives to the source code, which the compiler detects, analyzes and converts to a definition of priority levels.

Priority Functions

Embodiments of the invention allow a system to run different code segments at different priority levels. A function may be directly assigned a priority level without creating tasks. A priority function may be a usual function (e.g., C or C++ function) to which is assigned a priority level. The call to a priority function may be similar to a regular function.

When invoking a priority function, if its priority is above the priority of a currently running function, the former is called immediately. If its priority is below the priority of a currently running function, the request is stored in a database and the function is called when all higher priority functions have terminated.

The execution of a priority function proceeds like a standard function. A priority function is capable of executing without a dedicated stack, though the programmer may choose to implement a function specific stack, if desired.

When a priority function is called, the system does not require a context switch. Since priority functions do not need a separate stack, and since the context switch is minimal, a large number of priority functions can be defined without degrading performance or wasting system resources. Therefore, every sub-task in the traditional real-time operating system sense can be re-defined as an independent priority function, assigned any priority level, and called from anywhere in the code.

In embodiments of the invention, a priority function may take one or more arguments. An argument may be implemented as a pointer to a message to be delivered to the function. This messaging system provides inter-function communication. Embodiments of the invention may be implemented with or without message queues and/or mailboxes to execute function code.

In accordance with one embodiment of the invention, a priority function does not suspend execution while waiting for a new message. Rather, the function is called when a message is ready. Since a priority function does not suspend execution, semaphores are not used to protect shared data. Embodiments of the invention may provide dedicated priority functions that handle access to the shared data at a fixed priority level. The shared data may implicitly act like a first-in-first-out (FIFO) buffer. In another embodiment of the invention, the system may raise the priority level over the critical section, similar to the "priority ceiling" in traditional real-time operating system.

In one or more embodiments of the invention, a priority function "F" may not suspend its own execution to wait for the result of another priority function "G". If the result of "G" is necessary, the priority function "F" may be attached to a signal that is delivered when "G" is finished executing. In the latter case, it may be necessary to split the priority function "F" into two priority functions, "F1" and "F2". "F1" may run the code that is independent of the result of "G", and "F2" may be attached to a signal delivered by "G", and that runs after "G" is done.

In one or more embodiments of the invention, it is possible to mix priority functions and tasks within one system. Priority functions are more efficient than tasks, since they do not need a dedicated stack. However, in some embodiments of the invention, priority functions may be encapsulated inside a task in order to achieve time-slicing when needed.

In embodiments of the invention, priority functions may be implemented and/or called via an Application Programming Interface (API) routine that may decide at which point the priority function is called, e.g., based on the priority level of the priority function. If the priority function is not called immediately, it may be stored in a database for delayed execution. The API routine may take for arguments the priority function, the priority level, and the message to be passed to the function.

A database for storing functions (or references thereto) may, for example, possess a linear structure or a binary tree structure sorted in decreasing order of priorities. In an embodiment of the invention, a database may be implemented by limiting the total number of priority levels. In this latter case, priority functions at each level may be stored in linked lists. A bit associated to each level may be stored (i.e., "bit-mapped") in one or two integers, and set to "1" when the linked list is non-empty. A fast algorithm may be used to detect the highest bit that is set to 1, and therefore the highest priority function awaiting execution.

Embodiments of the invention may prevent accidental calling of priority functions as a normal function (which results in a priority level violation). In one or more embodiments of the invention, it is possible to hide the priority function, and to define a priority function handler that contains a pointer to the priority function. Thus, only the handler may be made visible to external code. Alternatively, the priority function may be made visible only through a cover function that calls the priority function via the API routine.

Priority functions may return values via the message that was initially sent to them. In the message, one or more fields can be reserved for any return values. In the latter case, the priority function does not free the message before returning. If the caller expects to receive the result from the priority function immediately after the call, the priority function may be assigned a priority higher than (or equal to) the priority of the caller. The message may be allocated on stack (instead of in dynamic memory) for more efficient code. An API may be provided that checks if the priority levels are consistent. If not, the API may report an error.

Priority Objects

In embodiments of the invention, an object such as a data structure may be assigned a priority level. A priority object may be any data structure or a resource that has been assigned a priority level. The functions, in this case, may be methods that perform operations on one or more objects with one or more priority levels. A priority function may inherit the priority level of the object it is processing. Priority objects may be viewed as a layer on top of the priority functions. The priority level of an object may be set at instantiation time of the object. The priority level may be inherited from a parent type or from a module's set of priorities.

In embodiments of the invention, an object may be assigned several priority levels as a multi-priority object. One priority level, (e.g., the highest priority level) may be reserved to update the object's data. Another priority level may be assigned to one or more methods that may operate on the object.

In embodiments of the invention, a priority object may be defined as a data structure along with a priority handler. The priority handler is a structure that comprises the priority level of the object. The priority handler may be embedded in the object's data structure, so that both may be allocated in one shot. The priority level may be initialized when the object is created. Also, the priority level may be inherited by any priority function to which the object is passed.

In embodiments of the invention, for debugging purposes, a priority object may be defined with a special keyword recognized by a pre-processor. The pre-processor may track the object throughout the code to verify that the object is accessed only via valid priority functions (e.g., its methods). The latter may be achieved more easily in object oriented programming languages. Alternatively, violations can be detected at run-time.

Priority Management

In one or more embodiments of the invention, priority functions may be executed, for example, at a level that is above the priority level of a standard task and below the priority level of a hardware interrupt. In some existing real-time operating systems, the priority functions can be assimilated to software interrupts with advanced features.

Priority functions have a number of advantages over software interrupts. For example, a priority function call is similar to a regular function call, and can be optimized by the compiler (e.g., saving only required registers); whereas a software interrupt is not recognized by a compiler and typically saves more registers. In addition, a priority function is more flexible than a software interrupt, in that a priority function may take any number and type of arguments, while a software interrupt takes just a single integer argument. Further, priority functions and priority objects can have dynamic priority levels, whereas software interrupts normally have fixed priority levels.

A priority function level, in accordance with an embodiment of the invention, may be established by issuing a software interrupt (or equivalent). In addition, a hardware interrupt may preempt a priority function by issuing a software interrupt. For example, given a first priority function "F1" triggered by software interrupt "S1", a second priority function "F2" triggered by software interrupt "S2", and a hardware interrupt designed to trigger "F2", if the priority level of "F2" is above the priority level of "F1", the hardware interrupt may issue a new software interrupt "S2" that triggers "F2". When "F2" is done executing, "S2" terminates and "S1" resumes.

In one or more embodiments of the invention, priority functions are not generally called directly with an object as a parameter (otherwise the priority level may be violated). Instead, an API routine may receive the call request along with a pointer to the priority handler, and a pointer to the object itself. To prevent a direct call to a function, the function may be hidden in a file and only made visible through a priority function handler containing a pointer to the function.

In embodiments of the invention, if the priority level of a new (e.g., newly triggered) priority function is above the priority level of a currently running function, the new priority function is called immediately. Otherwise, the new priority function may be stored in a database to be executed later, following a priority level order. Likewise, if the newly assigned priority level of an existing priority function is above the priority of a currently running function, the priority function with the newly assigned priority level is called immediately.

In the case when the priority level of a newly triggered function is equal to the priority level of a currently running function, the system may handle the call in several ways. If a new priority function "F2" is being called from within another priority function "F1" that is running at the same priority level, then the new priority function "F2" may be executed immediately, as if its priority level is above "F1". The latter case often occurs when several priority functions are running a related job. Embodiments of the invention may provide a special API to handle the case when there is a need to run a new priority function afterward.

In another embodiment of the invention, given a new priority function "F2" having a priority equal to that of a currently running function "F1", where "F2" is being called from a priority function "G" running at a higher priority level than both "F1" and "F2", the system may operate as though "F2" is being called from interrupt level (interrupt level acts like a virtual priority function with very high priority level). In the latter case, "F2" may be automatically stored in the database and activated after "F1" is done.

In one or more embodiments of the invention, to maximize efficiency, an API may be provided to allow inline calls to a priority function when both the current and new priority levels are known (e.g., constants). The overhead of calling a priority function may be entirely eliminated in the case where the new priority level is equal or above the current one.

In one or more embodiments of the invention, in order to manage a large number of priority levels, a separate file may be created to maintain all possible priority levels. The various priority levels may be listed in groups of decreasing order of priority. The priority of a group may be constant. Each priority level, defined in this file, may represent a given type of object, operation or a module. Furthermore, objects defined in other files may inherit any of the latter priorities. Preferably, objects with different priority levels are not simultaneously passed to a priority function.

Signals

One or more embodiments of the invention utilize signals for event synchronization and data protection. A priority function may be attached to a signal. For example, when a signal is received, the priority function may be sent to a scheduler. An attached priority function may be detached (canceled) before it has been sent to the scheduler. Embodiments of the invention may implement signals in various ways. The following are examples of flexible methods utilized in some embodiments of the invention.

1. Define each signal as a linked list of priority functions. Each time a priority function is attached to the signal, the handler of the priority function is appended to the linked list. When the signal is posted, all priority functions in the linked list are sent to the scheduler.

2. A more general method is to define a signal as an integer value. Different independent groups of signals may be defined, and each group may comprise its own set of signals and its own database. The database may comprise a hash table of size dependent on the desired efficiency. Each hash entry may point to a tree having a trunk and several branches. The trunk may list, in sorted order, the signals with different values. Each signal may possess a branch of priority functions. When a signal is posted, the corresponding branch is removed and all priority functions are sent to the scheduler.

The signal handling routines may be priority functions. The signal group may be a priority object, e.g., assigned a priority level above all priority functions that may be attached to the signal group. The signal handling routines may inherit the group priority level. Having a higher priority level than any attached priority function ensures proper priority level behavior.

Timers

Embodiments of the invention also utilize timers, which are a special case of signals. Timers may be defined as a layer on top of the second method of signal handling. Each signal value (integer) is the clock value at which the timer expires. When the timer expires, the attached priority function is executed. Different clocks (e.g., frame clock, time slot clock, etc) may be implemented as different groups of signals (with the timer routines running possibly at different priorities for different clocks).

In some instances, race conditions can arise between the time a Timer expires and the time the corresponding expiration function is called. The programmer may assume that, since the Timer has expired, the expiration function has been called and certain variables have been updated. However, the programmer's assumption may be incorrect if the expiration function gets delayed. To avoid those situations, a temporary function may be used as the expiration function. The Timer is not declared expired until after the temporary function is called. Then the temporary function may call the true expiration function (if no cancellations occurred). A similar technique may also be used with Signals.

Message Logging

Embodiments of the invention may implement a message logging function (e.g., as a priority function with low priority level). The message logging function may run in the background when there are messages for printing. The message logging function may maintain a linked list of pending messages (e.g., messages waiting to be printed). In the event of a system crash, the linked list can be recovered and the pending messages can be printed.

In embodiments of the invention, a message logging function may utilize a specific message format to improve efficiency. For example, a message may take a format string and a fixed number of arguments of type integers or pointers.

Memory Management

Embodiments of the invention provide efficient memory management methods to allocate object memory at any level, such as from an interrupt level, in order to schedule priority functions and pass them messages.

An embodiment of the invention may extend the capabilities of existing real-time operating systems. Byte-oriented memory allocation (i.e., allocation of variable size in bytes) is highly inefficient. Existing real-time operating systems offer block-oriented memory allocation. In embodiments of the present invention, blocks of fixed sizes can be pre-allocated and used by a specific task. The advantage is that memory allocation is extremely efficient.

A generalization of the block-oriented memory allocation is a variable-size block-oriented memory allocation. In this scheme, different block sizes are managed by the memory allocation routines. For example, blocks of sizes 8, 16, 32, 64, etc, can be defined. A block handler maintains, for each block size, a linked list of the free elements. Each linked list is assigned an index. When a block of a certain size is requested (e.g., 27), the size is rounded up to the nearest defined block size (e.g., 32). The index of the corresponding linked list is calculated. A free block in the linked list, if any, is returned. If there are no free blocks in this linked list, a new block is allocated from a large pool of memory. Blocks are allocated from this large pool sequentially and never returned. Once allocated, their size is fixed, and they can only be returned to the appropriate linked list. With this scheme, there is no need to pre-allocate blocks. The blocks can have a variable size and they are shared by different tasks (they are not preallocated by a given task).

In one or more embodiments of the invention, the memory allocation efficiency is improved by providing an API to return the index of the linked list corresponding to the block size for blocks of constant size. Each time such a block is to be allocated, the step of converting from block size to linked list index may be bypassed.

Compiler Augmented with Real Time Capabilities

An embodiment of the invention provides capabilities to a programming language compiler, interpreter or preprocessor to implement priority functions and priority objects (described above). The following describes how a compiler, interpreter or preprocessor can be augmented to automatically handle the addition of priority functions and priority objects in a source program code. As such, the work involved in developing real-time applications is drastically simplified. In addition, an embodiment of the invention allows a developer to quickly turn simulation code into real-time embedded software.

Figure 1:
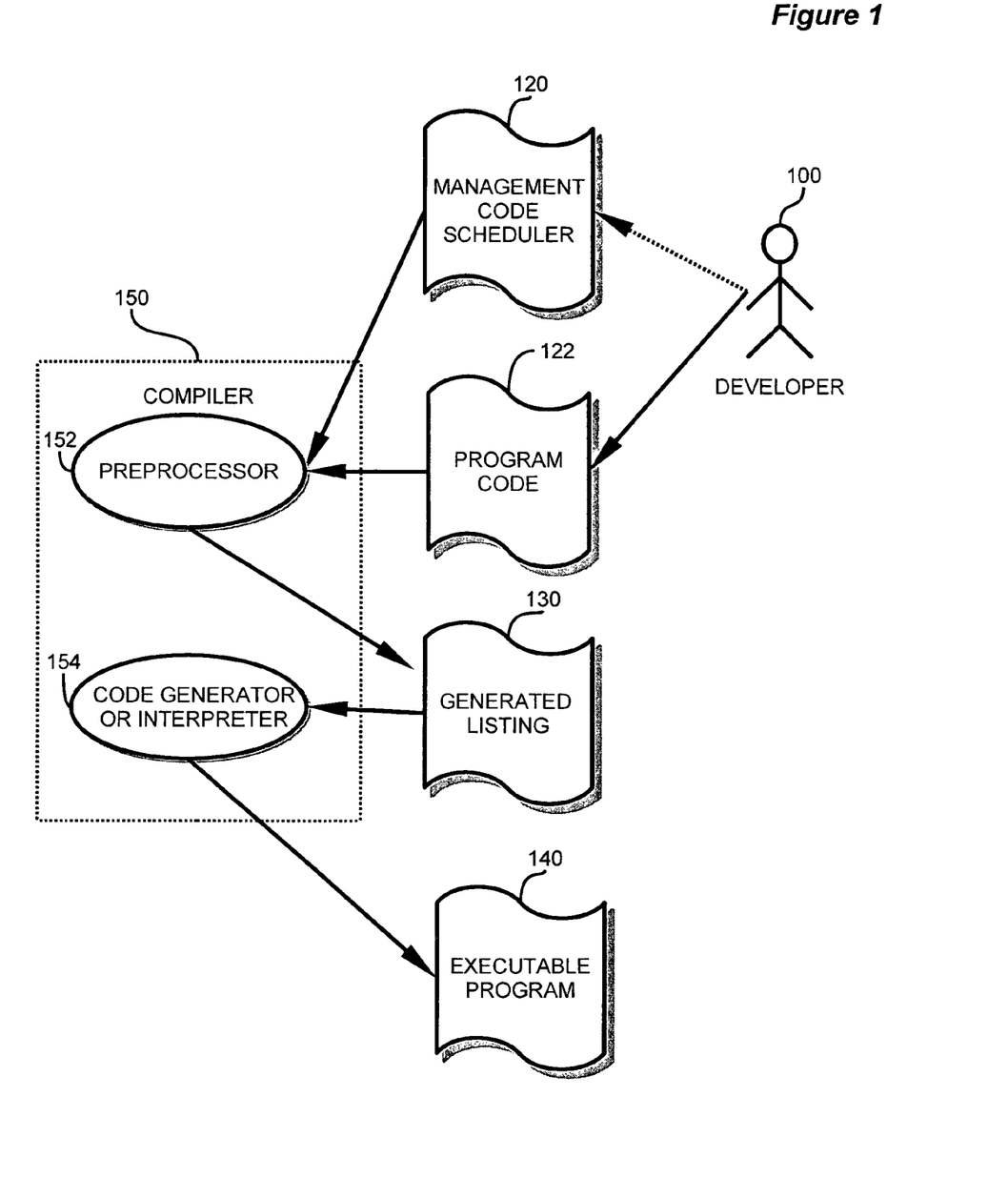
FIG. 1 is a block diagram illustrating a process through which a compiler facilitates computer programs in accordance with an embodiment of the invention.

FIG. 1 is a block diagram illustrating the process through which a compiler embodying the invention facilitates computer programming in accordance with an embodiment of the invention. A developer 100 may provide computer program source code for implementing priority functions and all source code for enabling a system to implement and manage priority functions, including source code for implementing a scheduler, memory management, priority management and any other program code useful for priority functions. The latter source code may also be provided through a third party software developer. The programmer may utilize the third party software to include priority function capabilities in his own programs.

A developer 100 typically provides the source code for software and includes, within the source code, instructions that imply the use of priority functions and associated functionality. A developer 100, using a compiler, preprocessor or interpreter in accordance with an embodiment of the invention, may defer to the compiler, preprocessor or interpreter the responsibility for packing function arguments inside message structures and sending messages between tasks. Furthermore, existing code may be quickly converted (to include real-time capabilities) by adding a few directives to define the priority functions and their priority levels.

A developer 100 may declare a function "F" to be a priority function with priority "P" by using a compiler directive. The directive indicates to the compiler that the function should be called in a special way. The directive can be written, for example, at the start of the function "F", preceding the declaration of "F" or anywhere in the source code, provided the compiler may access the directive to act upon it. Listing 1 is an example of source code directives that may be used to declare a function as a priority function.

---
Listing 1:
---
1. __priority__(P)
2. SET_PRIORITY P
3. PRIORITY_FUNCTION P
4. #pragma priority P
5. #priority P
6. priority_function(P)
---

Likewise, a group of contiguous functions (e.g., in a file) may be declared as priority functions with the same priority level "P" declaration by wrapping the group with directives. Listing 2 is an example of source code directives that may be utilized to declare a group of functions as a priority function.

---
Listing 2:
---
1. SET_PRIORITY P
   SET_PRIORITY_END
2. #priority P
   #priority_end
---

However, if a function within the group is not supposed to be a priority function, then this function may have a special directive such that it is excluded from the group. Listing 3 is an example of source code directives that may be utilized to specify that a given function (e.g., within a group of functions) may not be a priority function.

---
Listing 3:
---
1. SET_PRIORITY_NONE
2. PRIORITY_FUNCTION_NONE
3. #pragma not_a_priority_function
4. #priority_none
---

Using an embodiment of the invention, a developer 100 may create a call to a priority function the same way he or she would call a normal function. The compiler does the embedding of the code necessary for managing function priorities. For example, a developer may create a call in the "C" language as follows:

A_Function ("Arguments"

where "Arguments" comprises the usual notations for passing arguments to a function. A compiler converts function "F" into a priority function by obtaining or creating a wrapping code or new entry points in management code scheduler 120.

In embodiments of the invention, a scheduler may be implemented to handle calls to priority functions that are not called immediately, i.e., postponed priority functions. The call to such priority functions may be stored in a database that may be optimized for storing and retrieving call information for priority functions. The database maybe maintained by the Scheduler. The compiler may call the Scheduler in order to store calls to be postponed for priority functions. In an embodiment of the invention the compiler utilizes a symbol name of the Scheduler's function. The latter may be a standard symbol name or any specific name supplied via a compiler directive such as shown in listing 4.

---
Listing 4:
---
1. SCHEDULER symbol
2. #pragma scheduler symbol
3. #scheduler symbol
---

In the "C" language, for example, the symbol name can be provided in the compiler's command line arguments (e.g., -D_SCHEDULER_=symbol). The compiler may also be instructed how to pass arguments to the Scheduler. The passing of arguments may be standardized or specified via one or more directives, for example.

In one embodiment, priority functions are normally executed in a context that has lower priority than the context of hardware interrupts. Thus, when calling priority functions from hardware interrupts, they may be postponed.

Embodiments of the invention may provide the added benefits of priority functions to software without affecting compilers that do not implement the invention. Hence, the same code can be successfully compiled with standard compilers without the real time features. For instance, for the standard C language, a macro or "pragma" directive may be used to trigger the implemented compiler capability, if such capability is present.

In accordance with one or more embodiments of the invention, a compiler 150 may include multiple components. For example, the compiler may comprise a preprocessor 152 and a code generator 154. The preprocessor 152 supports all benefits of preprocessors known in the art of computer software development. Such preprocessor may comprise a syntax analyzer, a macro interpreter and all components that allow a compiler to analyze source code, check its integrity and compatibility with respect to a given language, and any other component useful for analyzing source code.

In one embodiment of the invention, the preprocessor analyzes the short statements developer 100 places in source code 122, and incorporates the proper portions of source code from source code 120 to provide the desired additional functionality (e.g., priority function call management). The result of preprocessing the source code is a more complete listing 130. The generated listing 130 is then converted by the code generator 154 to computer code 140.

Figure 2:
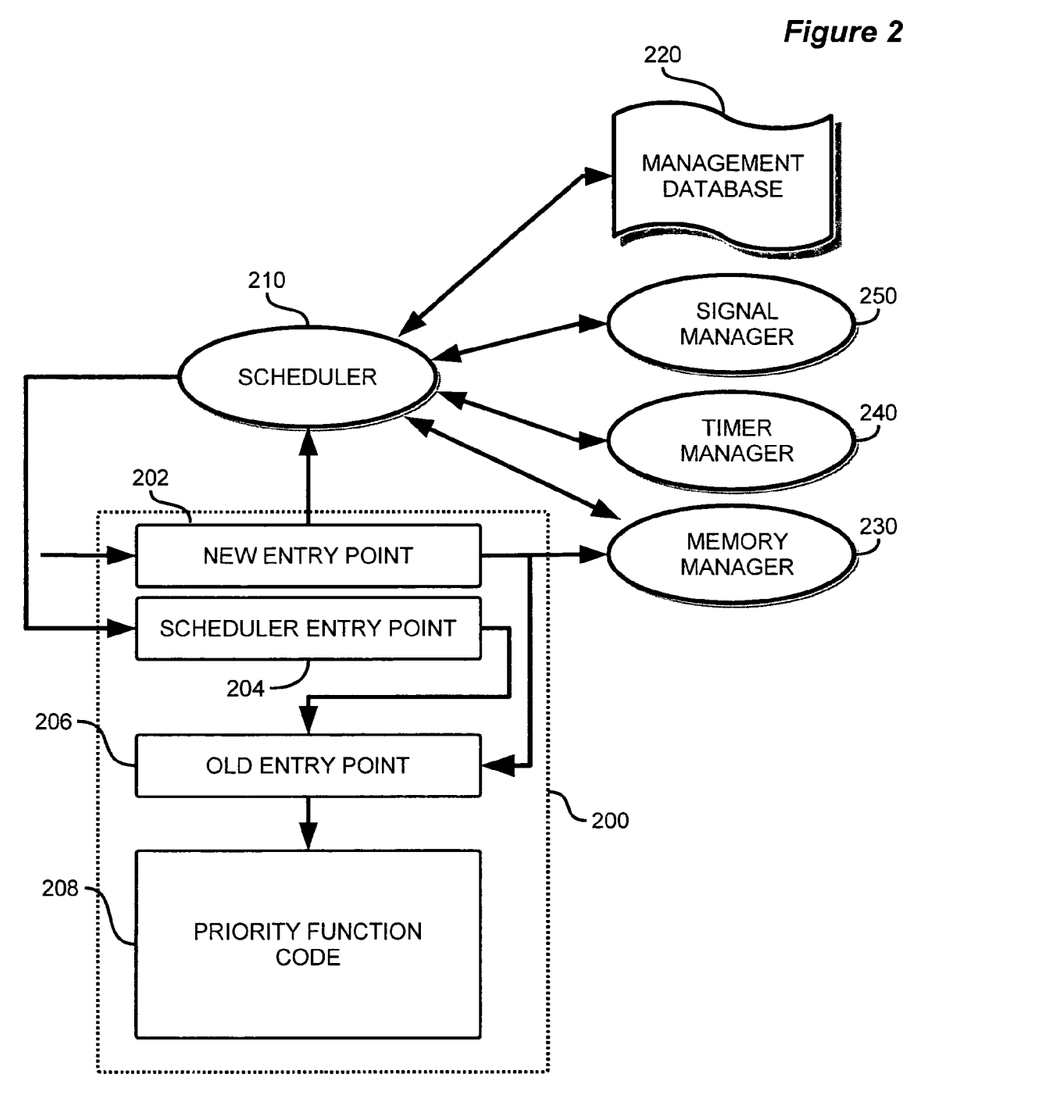
FIG. 2 is a block diagram that illustrates components involved in implementing priority functions and priority management in accordance with an embodiment of the invention.

FIG. 2 is a block diagram that illustrates components involved in implementing priority functions and priority management in accordance with an embodiment of the invention. In one or more embodiments of the invention, a priority function 200 may be defined with one or more entry points, blocks 202, 204 and 206, and other executing code 208. Entry points may be defined as "old" entry point "Fo" 206 (this is the traditional, non-priority entry point of the function); "new" entry point "Fn" 202 (this is the entry point of the priority function when it is first called, i.e., "new"); and "scheduler" entry point "Fs" 204 (this is the entry point when a postponed priority function is called from a Scheduler 210 (see below)).

When calling function "F" 200, the "new" entry point "Fn" is invoked. The embedded priority management code at the "new" entry point may compare the priority level "P" of function "F" to the priority level "Pcurrent" of a currently running function. If "P" is higher than Pcurrent, then the function "F" is "called" immediately by jumping to old entry point "F0". If "P" is less than "Pcurrent", then the embedded priority code may save the arguments of function "F" in a memory block "M" obtained from the Memory Manager 230 (see below). The embedded priority code may then call the Scheduler with a pointer to the entry point "Fs", a pointer to the memory block "M", and the value of the function's priority level "P". The Scheduler may store the call in a database 220, allowing the function call to be postponed.

A postponed function call is executed when its priority level becomes current, i.e., when its priority becomes higher than other running functions. The Scheduler 210 calls the function via the entry point "Fs", and supplies a pointer to the memory block "M".

The entry point "Fs" may restore the function's arguments from the memory block M. "Fs" may also free the memory block "M" by returning it to the Memory Manager, "call" function "F" by jumping to entry point "Fo". When function "F" terminates, it returns to the caller (e.g., the Scheduler). The Scheduler may then call other (e.g., lower priority) functions.

In one or more embodiments of the invention, some or all of the above steps may be declared as "inline" code and optimized when the compiler is aware (e.g., at compile time) of the priority level P and the current priority level Pcurrent of the caller function. For example, if a first function "F" has been called from a second function "F1", and if the respective priority levels are known with "P" greater than or equal to "P1", the compiler can generate a direct call from function F1 to "old" entry point Fo of function F. This way, zero overhead is incurred when calling the priority function F.

In one or more embodiments of the invention, a Memory Manager (e.g., 230) is employed as an efficient dynamic memory handler. The memory manager provides functionality similar to the well known "malloc" and "free" functions of the C language. However, standard "malloc" and "free" functions can be too inefficient, hence higher performance memory management may be used instead. The Memory Manager may be implemented independently of the compiler.

For postponed priority functions, the compiler obtains a memory block M from the Memory Manager. Therefore, the compiler needs to know the symbol names of the Memory Manager functions. These can be either standard symbol names or specific names supplied via compiler directives such as shown in listing 5.

Listing 5:

1. MEMORY_MANAGER_MALLOC symbol
   MEMORY_MANAGER_FREE symbol
2. #pragma memory_mananager_malloc symbol
   #pragma memory_manager_free symbol It is noteworthy that the size of the memory block M may be known at compile time. Therefore, the compiler can access a highly efficient version of function "malloc" that works on a known memory size at compile time.

In one or more embodiments of the invention, a function that returns a value to the caller, a function that writes to global data that is also accessed by the caller, or more generally, a function that changes a state that affects the caller may undergo additional steps to convert to a priority function. If the function's priority level is higher than the caller's priority level, the function can be converted into a priority function as previously described. However, if the function's priority level is lower than the caller's priority level, the function call is postponed. Hence, the state change may not occur as the caller expects. To obviate this condition, the function may be sub-divided into two or more sub-functions, some running at low priority, others at high priority. Also, global data may be accessed by low and high priority code. The global data may be compromised if not protected. Traditionally, data protection is achieved via semaphores or a priority ceiling.

Using existing compilers, a programmer must pay special attention to all such problems and may have to redesign some functions. A compiler augmented with the invention may help in detecting these conditions. The compiler is able to detect, for example, that global data is being accessed from two priority functions with different priority levels. The compiler can then issue a warning.

One or more embodiments of the invention may implement dynamic priority levels and priority objects. For example, priority functions may inherit the priority level of the objects they access. In the latter case the priority level is assigned to the data object instead. Each method running on the data object may inherit the priority level of the data object. Moreover, the priority level can be decided in a dynamic way at run time. A variety of ways may be utilized to define the priority level of an object, such as statically or dynamically.

The example in "C" language below shows an implementation of a dynamic priority level that is stored in a variable.

Listing 6:

```
/* C example of a dynamic priority
 * priority level stored inside
 * a Modem's Layer 1 data structure.
 */
struct Layer1 {
  int priority;
  ...
} L1;
/* L1 Transmit function.
 * The priority level is dynamic,
 * stored in the argument, struct l1
 */
void l1_transmit(struct Layer1 *l1) {
  PRIORITY_FUNCTION l1->priority
  ...
}
```

The example (in "C++") given below shows an implementation of priority level as a special class inherited by other classes. The compiler may handle the latter class in a special way.

---
Listing 7:
---

```
// C++ priority class
class _priority_ {
    priority;
    protected:
    _priority_(int priority) : priority(priority) { }
};
// C++ class definition for a
// Modem's Layer1 object with a
// priority level. It inherits the priority class.
class Layer1 : public _priority_ {
    Layer1(arg1, arg2, int priority) :
        _priority_(priority) {...}
};
// C++ object instantiation with priority P
class Layer1 *L1 = new Layer1(arg1, arg2, P);
```

Listing 8 provides another example where the compiler eases the responsibilities of the programmer/developer.

---
Listing 8:
---

```
class Layer1 {
    _priority_object_;
    ...
};
class Layer1 *L1 =
    new Layer1(...) _priority_object_ = P;
    // Or
    class Fifo *fifo = new Fifo(...) _priority_(P);
```

In the example of listing 8, at the object instantiation with variable priority P, the methods in the class inherit the priority value P. The compiler may add a field in the object structure that contains the priority level. When an object's method is called, the compiler automatically handles it like it handles priority functions except that the priority level is dynamically obtained from the object's structure. If the developer desires that some methods in the class not inherit the priority value supplied at instantiation time, then a declaration such as that shown in listing 9 may be used.

---
Listing 9:
---

```
class Layer1 {
    _priority_;
    ...
    // This one inherits the priority
    // at instantiation time
    function1( ) {
        ...
    }
    // This one does not inherit
    // priority (e.g., fixed priority)
    function2( ) {
        _priority_(10);
        ...
    }
};
```

In some embodiments of the invention, a class may be given several priority levels (see listing 10).

---
Listing 10:
---

```
class Layer1 {
    _priority_(int P1, int P2);
    // Unspecified values for now
    ...
    function1( ) {
        _priority_(P1);
        ...
    }
    function2( ) {
        _priority_(P2);
        ...
    }
};
Layer1 *l1 = new Layer1(...) _priority_(5, 10);
```

In order to obtain better in-lining and optimization, it is possible to specify the range of priority values that an object can take. Hence, even if the priority value is unknown at compile time, the compiler can tell that the priority will be above or below some value. This way the compiler can generate more optimized code. Specifying a range can be done with a directive (see listing 11).

---
Listing 11:
---

```
// Specify a dynamic priority level
// in the range 10 to 20
class Layer1 {
    _priority_ [10, 20];
    ...
};
```

In one or more embodiments of the invention, a Timer Manager (e.g., block 240) may be used to handle time events. The Timer Manager 240 works with priority functions. For example, where a priority function is scheduled to run at a specific time in the future, the Timer Manager calls the priority function at the desired time. The Scheduler may be used to ensure that the timer manager is called at the appropriate priority level. In order for the Timer Manager to schedule a priority function call at some time in the future, it may need to obtain from the programmer the following items: a pointer to the priority function, a pointer to a memory block where arguments may have been stored, the time value, and any other parameter to manage the timer. A compiler embodying the invention may help considerably in implementing and managing timers by automatically providing the appropriate parameters. From the programmer's point of view, calling a function at time T may be expressed using a simple syntax (e.g., "_time_(T) F(args)", "F(args)_timer_call_(T);", "#timer_call T F(args)" or any other simple syntax for implementing a timer).

A compiler embodying the invention calls a Timer Manager function (e.g., FTM) to schedule a call for priority function F with priority level P at time T as described below.

In embodiments of the invention a Scheduler may interact with the Timer Manager. The compiler implements: code for storing the priority function's arguments in a memory block M obtained from the Memory Manager; code for calling a Timer Manager's function (e.g., with a pointer to the entry point Fs); a pointer to the memory block M; the value P; and the time value T. When the time T is reached, the Timer Manager calls the "Scheduler" with a pointer to entry point Fs, a pointer to M, and the value T. The Scheduler does the rest. The latter steps may also be implemented when the compiler implements calls to the scheduler to postpone a priority function.

In another embodiment of the invention, the Timer Manager may be unaware of the Scheduler. In this case, a compiler embodying the invention may implement code for storing the priority function's arguments in a memory block M obtained from the Memory Manager, including the value of the priority level P (e.g., at the end of M). The compiler may predefine an additional entry point Fp that is capable of extracting from the memory block the value P, and calling the "Scheduler" with a pointer to an entry point Fs, a pointer to the memory block and the value of the priority level. The compiler may implement code to return to the calling code, and to call the Timer Manager function FTM with a pointer to entry point Fp, a pointer to memory block M, and the value of time T. When the time T is reached, the Timer Manager calls may call the entry point Fp with a pointer to M. The rest may be executed by the embedded code at the additional entry point Fp.

Similarly to implementing priority functions, priority objects and other priority management functionality in embodiments of the invention, a Timer Manager's function may be implemented using directives. Also, the Timer Manager's functions themselves may be declared as priority functions (e.g., with very high priority levels for proper behavior).

One or more embodiments of the invention support calling via a function pointer. In the instruction "_time_(T) F(args);", if F is a symbol that is known at compile time (or at preprocess time), then the compiler can determine the associated symbol Fs (and other related symbols). However, if F is a function pointer, the compiler or preprocessor cannot determine Fs at compile time. Several solutions can be envisaged at run time:

Using a function pointer to Fs instead of F: The programmer could directly use a function pointer to Fs in the function call following a "_time_(T)" directive. This is the simplest solution and the most efficient from an implementation point of view. But it does require a little more effort from the programmer to handle the function pointer to Fs.

Passing extra arguments to entry point Fn: The new entry point Fn could receive extra arguments that it decodes in order to tell whether the programmer is issuing a direct call to F or an indirect call via the directive "_time_(T)". The extra arguments can be passed in registers or on the stack, not a portable solution. The arguments can be passed via global variables, which may require disabling interrupts for a short period of time (or an equivalent solution).

Storing the address of Fs in a location directly preceding Fn. Hence, the compiler can obtain the value of Fs simply by knowing the value Fn.

Embodiments of the invention may implement a Timer Manager 240 in any application code that needs to handle priority functions in a direct or indirect manner. In addition to the Timer Manager, other types of managers may be similarly implemented. For example, a Signal Manager 250 may be used to call priority functions when a signal occurs. The programmer can schedule a priority function to be called when an appropriate signal occurs. The programmer may use the following to invoke a timer manager:

```
F(args) _signal_(S);
#signal S F(args); or
_signal_(S) F(args);
```

Figure 3:
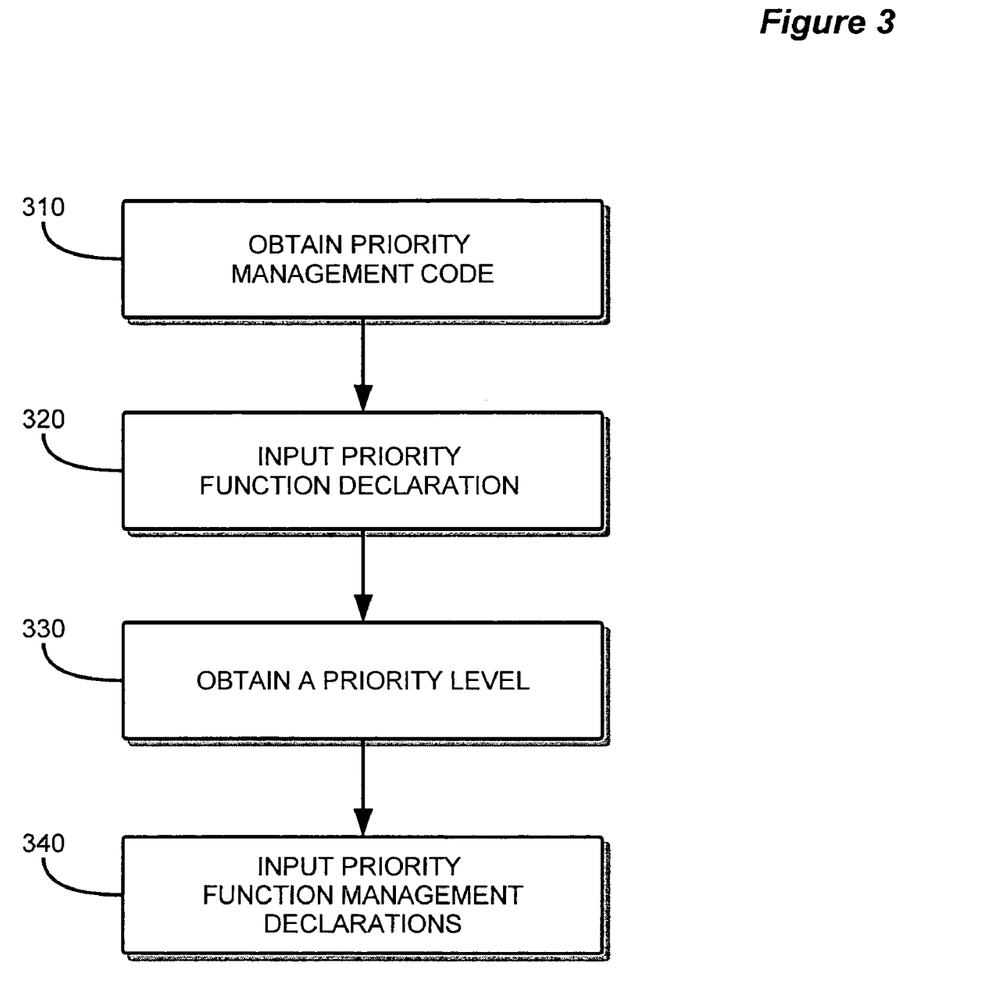
FIG. 3 is a flowchart diagram that illustrates a method for implementing real-time functionality in accordance with an embodiment of the invention.

FIG. 3 is a flowchart diagram that illustrates overall steps involved in implementing real-time functionality in accordance with an embodiment of the invention. At step 310, a compiler embodying the invention obtains priority management code (e.g., block 120). The management code may comprise source code for routines referenced in the source of applications (e.g., 122). At step 320, the compiler obtains a declaration input for creating a priority function (e.g., see Listings 1, 2 and 3; see Listing 1, line 1), then inputs the appropriate code from the management code 120 into an application's source code. At step 330, the compiler obtains the priority level from an application's source code (see Listing 1, lines 2 and 3). At step 340, the compiler obtains the source code of management instructions (see Listing 4, 5, 6 and 7). The latter step involves further analyzing the source code in view of the priority levels (e.g., as declared by the programmer), and including the proper management code in the application's source code in lieu of the programmer's declarations (e.g., see Listings 4 through 11).

Figure 4:
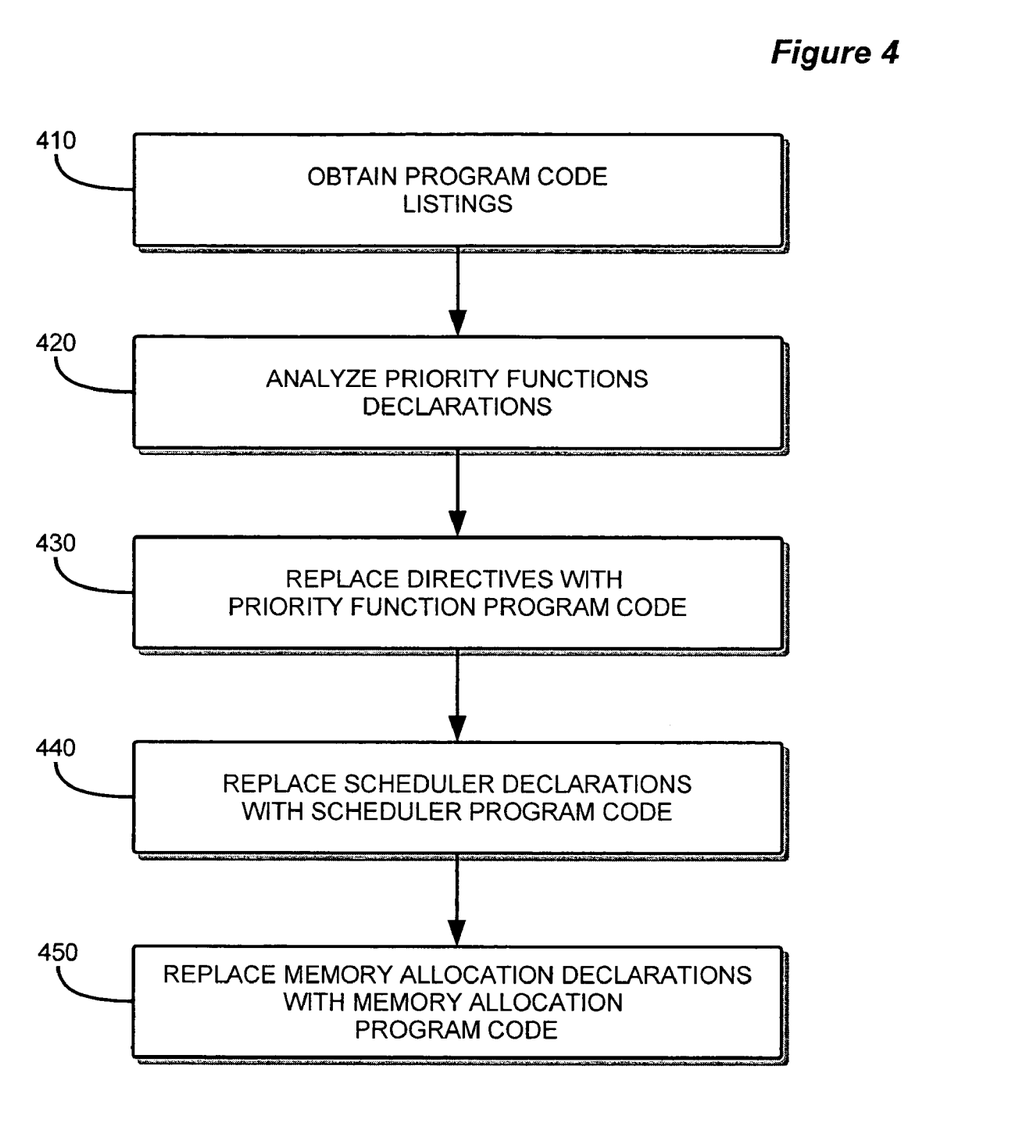
FIG. 4 is a flowchart diagram illustrating a compiler method for processing source code in accordance with an embodiment of the invention.

FIG. 4 is a flowchart diagram illustrating method for a compiler to process source code in accordance with an embodiment of the invention. At step 410, a compiler embodying the invention invokes the compiler portion (e.g., a preprocessor) that loads the code listing and performs an initial check, such as checking for the availability of all necessary files. At step 420, the compiler analyzes the priority function declarations in the listing. The latter step may involve analyzing priority levels of all declared priority functions in order to determine priority levels within priority functions and, eventually, with respect to other tasks. Furthermore, the compiler may determine that a function should be divided into two or more pieces of code, each of which may be implemented as a priority function with its own priority management code (see above for details).

At step 430, the compiler inserts the proper code (e.g., function headers, code for entry points) for handling priority function calls, and management of priorities. The output may be a listing (e.g., see block 130) that has sufficient instructions to be converted into executable code (e.g., see block 140). At step 440, the compiler analyzes the declarations to implement a scheduler, and inserts the management code for a scheduler in the output code. At the latter step, the compiler may perform further analysis to determine the appropriate entry points to connect with the scheduler. At step 450, the compiler analyzes the declarations for implementing a memory manager, and inserts the code in the output code.

Figure 5:
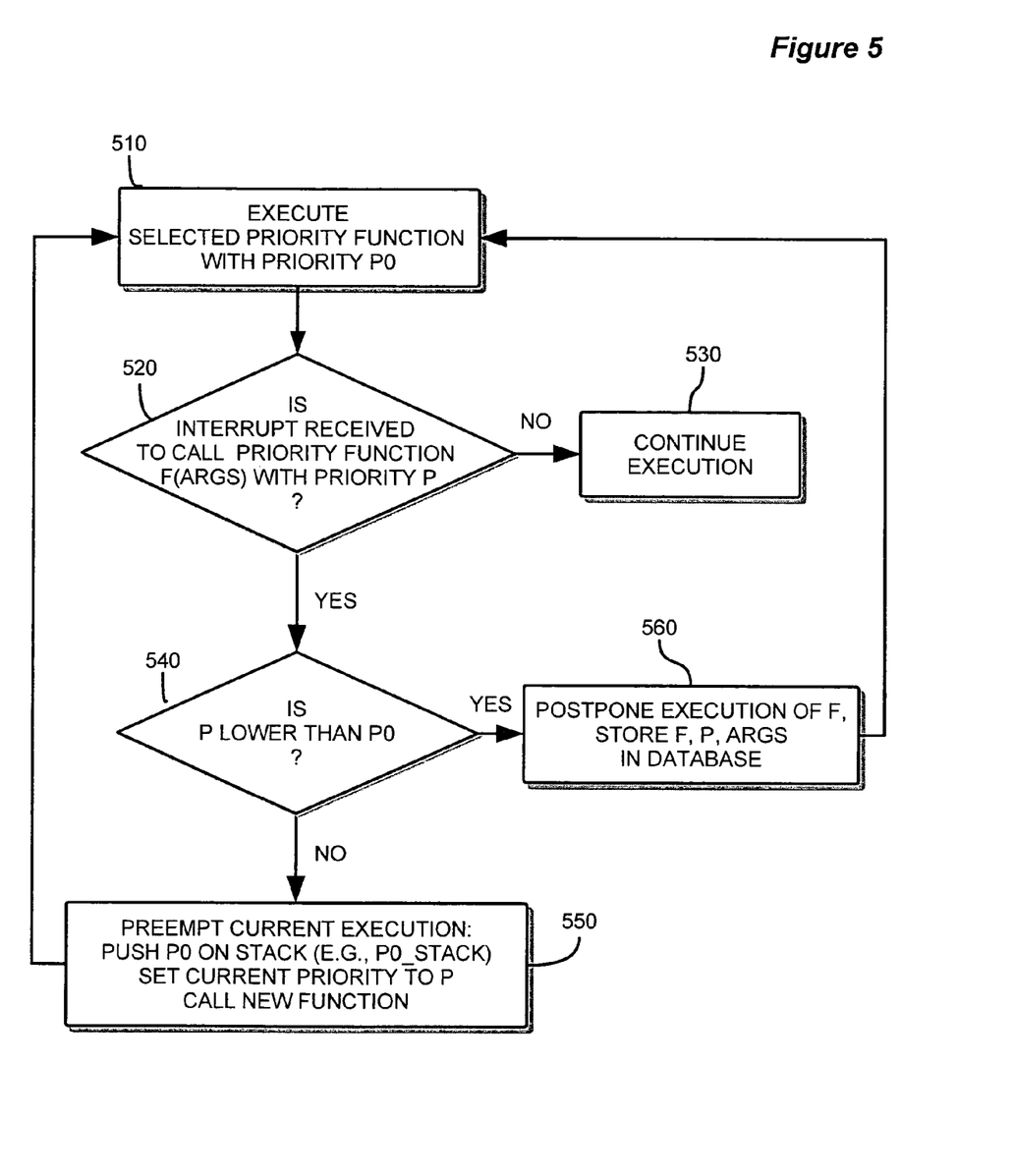
FIG. 5 a flowchart diagram that illustrates a method for scheduling priority function execution at runtime in accordance with an embodiment of the invention.

FIG. 5 is a flowchart diagram that illustrates a method for scheduling priority function execution at runtime, in accordance with an embodiment of the invention. At step 510, the scheduler receives an instruction to run a first priority function at a first priority level. While the system is executing the first priority function, the system may receive a call to a second priority function. Such a call may be triggered through a hardware interrupt, a software interrupt or a combination thereof as described above. At step 520, the scheduler may be called to run the second priority function. While the system does not receive any interrupt, the system continues to step 530. The function runs until it has finished. If the system receives an interrupt, the scheduler checks the priority of the interrupt against the function currently running at step 540. If the new function call has a priority level that is lower than the first priority function currently running, then the scheduler postpones the execution of the newly called function at step 560. Postponing a function's execution may involve storing the parameters of the function in a database. The data in the database may comprise the function's pointers, the function's priority level, the function arguments and any other parameter that may be required to execute the function at a later time.

If the scheduler determines that the newly called function must start immediately, the scheduler preempts the first function currently running, at step 550. Preempting the execution of a running function may require saving the parameters of the currently running function on a stack in order to be able to resume execution after the higher priority function has finished executing.

Figure 6:
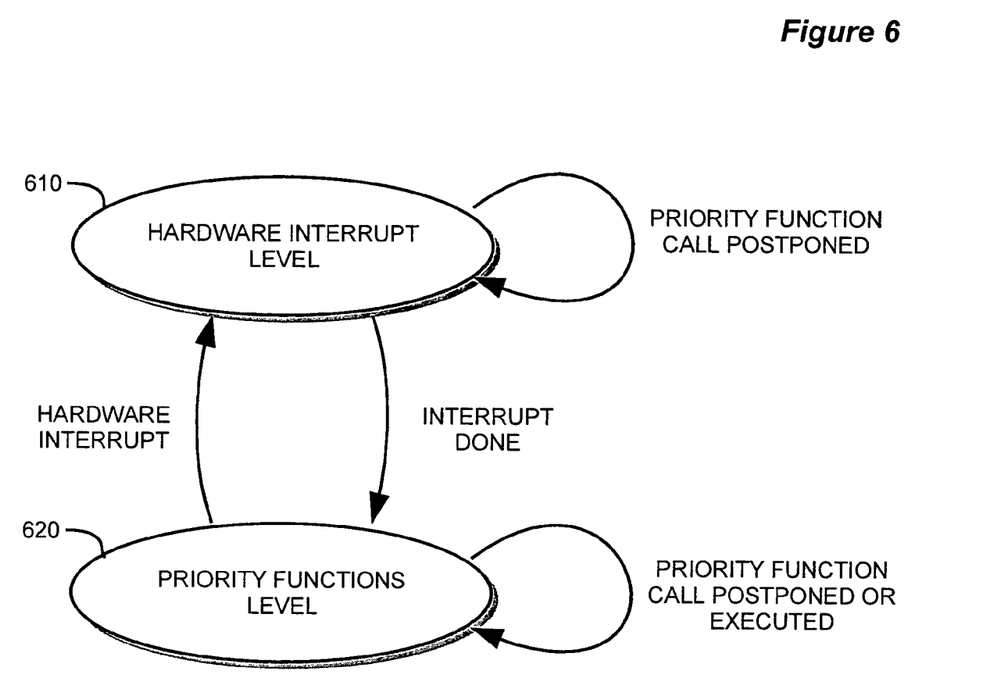
FIG. 6 is a state diagram illustrating priority execution in accordance with one or more embodiments of the invention.

FIG. 6 is a state diagram illustrating execution states for handling hardware interrupt processing and priority function processing, in accordance with one or more embodiments of the invention. The diagram of FIG. 6 includes hardware interrupt state 610 and priority level execution state 620.

Assuming the system is in hardware interrupt state 610, each priority function call received while in state 610 is postponed (the priority function has a lower priority than a hardware interrupt), and the state is unchanged. Once the processing for the hardware interrupt is completed, the system may transition to state 620 for processing of priority functions.

For each priority function call received while in state 620, whether executed or postponed, the system remains in state 620. However, once a hardware interrupt is received, the system state transitions to hardware interrupt state 610, and all calls to priority functions are postponed while the hardware interrupt is processed.

The state diagram of FIG. 6 may be expanded to include multiple states for handling of multiple function priority levels, based on the foregoing methods for handling function priorities (as well as software interrupts). Though the state diagram of FIG. 6 is presented to illustrate an abstract processing model of one or more embodiments of the invention, actual embodiments of the invention may or may not embody actual state machines (i.e., with explicit state mechanisms) as part of the priority management system.

Examples of Benefits Provided by the Invention

A programmer using a system embodying the invention may implement priority functions and priority function management in a simple manner. The following listing shows an example to declare a function as a priority function:

---

Listing 12

```
void write_device(...)
{
    _priority_(10);
    ...
}
void read_fifo(Fifo *f, ...)
{
    _priority(f->priority);
    ...
}
some_function( )
{
    Layer2 *12 = new Layer2(...) _priority_(5);
    _time_(123) write_device(...);
    ...
}
```

---

An entire real-time operating system may be developed with priority management using an embodiment of the invention. To illustrate the benefits of the proposed real-time operating system, one may consider the typical example of timers. Designing a good timer application is a difficult problem in traditional real-time operating system. The main issue is concerned with which task the timer expiration function should run. Some traditional real-time operating systems handle timers in a flexible way. As such, all timer expiration functions are executed in a special task having a very high priority. A requirement on the expiration function is to be very short (heavy system calls have to be avoided). The expiration function then sends a message to the task that is meant to execute the bulk of the code. However flexible this solution is, it still requires that messages have to be defined, dispatchers have to be written and context switches have to occur when timers expire.

In a real-time operating system embodying the invention, a timer application may be developed in a straightforward manner by implementing priority functions. When a timer expires, the attached priority function is called (like a regular function) at the corresponding priority level, and with the corresponding message argument.

Another example of the benefits of a real-time operating system embodying the invention is related to the user interface and host port. In a traditional real-time operating system, a user interface is often implemented as a background task. In such environments, an instruction is received from a keyboard via a serial connection, for instance. The instruction is then dispatched to the appropriate task and subtask. This normally involves the following steps:

Define a message from the user interface task to the recipient task.

Write a dispatcher to send the message to the recipient task.

In the recipient task, write another dispatcher to call the sub-task that will execute the instruction.

Adding a new user interface instruction requires several steps. It also involves several context switches. If an instruction is moved from one task to another (for some reason), several dispatchers have to be updated. A good knowledge of how the tasks are organized and in which task the instruction should execute is also necessary. The job is relatively involved for a new programmer who does not yet have a global understanding of the overall organization of tasks and sub-tasks in the project.

In a proposed real-time operating system that embodies the invention, a user interface may be implemented as a set of priority functions. The instruction received from the user interface is defined as a priority function. The instruction is called in a straightforward manner from the user interface. The steps above are not needed. In addition, a detailed understanding of the organization of the tasks is not required. This instruction may be executed independently (outside any particular task).

Another benefit of a system implementing the invention is concerned with the writer and reader problem. A writer and reader are often implemented as two tasks in traditional real-time operating system. When new data is received, the writer writes it to a shared first-in-first-out (FIFO) buffer. When the writer is done, it posts a semaphore or a signal for the reader and it suspends (waiting for new data). The reader is awakened. It reads the FIFO content. When done reading, the reader suspends for the semaphore or signal delivered by the writer. Context switches occur each time the writer or reader is awakened or suspended.

In a proposed real-time operating system based on the invention, priority functions remove the need for heavy context switches. When new data is received, the writer writes it to the FIFO. It posts a signal for the reader and returns (or it can call the reader directly). The reader is called, it reads the data and before returning it re-attaches itself to the signal delivered by the writer.

Another benefit of using an embodiment of the invention is concerned with a dialog box in a graphical user interface (GUI). A dialog box in a GUI is sometimes implemented as a thread. This way the software keeps running while the dialog box prompts the user for input. Such a dialog box can instead be implemented with priority functions, saving stack space and complicated mailboxes for inter-thread communication. Embedded real-time operating system can save resources this way. In general, it is only necessary to create a new thread when true time slicing is required. This is the case when two different applications are running concurrently. It is seldom the case within one application. For instance, if the dialog box needs to execute a piece of code, usually the remaining of the application can wait, or the dialog box can wait.

Thus, a method and apparatus for implementing and managing priorities of computer operations have been provided. Embodiments of the invention provide a framework for developing applications that implement and manage the sequence of execution. This framework removes much of the programmer's overhead work necessary in a traditional real-time operating system, where a major effort is required to obtain a clean design of tasks, mailboxes, and other required necessary components.

Particular embodiments described herein are illustrative only and should not limit the present invention thereby. The invention is defined by the claims and their full scope of equivalents.

What is claimed is:

1. In a computer system, a method for implementing priority management comprising:
   obtaining a first program code comprising a function declaration for a function and at least one priority management declaration, said at least one priority management declaration indicating that a function call at runtime to said function is to be handled according to a priority level associated with said function;
   detecting said at least one priority management declaration in said first program code; in response to detecting said at least one priority management declaration, obtaining pre-existing program code configured to manage a priority call to a given function; and
   providing a second program code comprising said first program code with said pre-existing program code embedded therein;
   wherein detecting said at least one priority management declaration comprises detecting a scheduler declaration;
   wherein providing said second program code comprises embedding scheduler program code;
   wherein said scheduler program code is configured to compare a priority level of said function with a current priority level associated with a currently running operation; and
   wherein said scheduler program code is further configured to postpone an execution of said function when said priority level is less than said current priority level.

2. The method of claim 1, wherein detecting said at least one priority management declaration comprises detecting at least one compiler directive.

3. The method of claim 1, wherein detecting said at least one priority management declaration comprises detecting a priority level declaration having a priority value.

4. The method of claim 1, wherein detecting said at least one priority management declaration comprises detecting at least one signal manager declaration.

5. The method of claim 1, wherein detecting said at least one priority management declaration comprises detecting at least one memory manager declaration.

6. The method of claim 1, wherein providing said second program code comprises embedding database program code configured to store runtime information of said function.

7. The method of claim 1, wherein detecting said at least one priority management declaration comprises detecting at least one timer manager declaration.

8. The method of claim 1, wherein providing said program code comprises: embedding a priority entry point for said function, said priority entry point configured to receive a new call to said function, said priority entry point comprising program code configured to compare said priority level of said function with a current priority level of a computer operation.

9. The method of claim 1, wherein providing said program code comprises: embedding a scheduler entry point for said function, said scheduler entry point configured to receive a call from a scheduler, said scheduler entry point comprising program code configured to obtain stored data associated with a prior postponement of said function.

10. A computer program product comprising: a non-transitory computer readable medium having computer readable program code embodied therein for implementing management of real-time computer operations, said computer readable program code comprising:
    computer program code configured to cause a computer to obtain a first program code comprising a function declaration for a function and at least one priority management declaration, said at least one priority management declaration indicating that a function call at runtime to said function is to be handled according to a priority level associated with said function;
    computer program code configured to cause a computer to detect said at least one priority management declaration in said first program code;
    computer program code configured to cause a computer, in response to detecting said at least one priority management declaration, to obtain pre-existing program code configured to manage a priority call to a given function; and
    computer program code configured to cause a computer to provide a second program code comprising said first program code with said pre-existing program code embedded therein;
    wherein detecting said at least one priority management declaration comprises detecting a scheduler declaration;
    wherein providing said second program code comprises embedding scheduler program code;
    wherein said scheduler program code is configured to compare a priority level of said function with a current priority level associated with a currently running operation; and
    wherein said scheduler program code is further configured to postpone an execution of said function when said priority level is less than said current priority level.

11. Computer program code embodied in a non-transitory computer readable medium, comprising:
    obtaining a first program code comprising a priority function declaration for a function and at least one priority management declaration, said at least one priority management declaration indicating that a function call at runtime to said priority function is to be handled according to a priority level associated with said priority function;
    detecting said at least one priority management declaration in said first program code;
    in response to detecting said at least one priority management declaration, obtaining pre-existing program code configured to manage a priority call to a given function; and providing a second program code comprising said first program code with said pre-existing program code embedded therein;

said priority function comprising function code, a new entry point configured to receive a new call to said priority function and a scheduler entry point configured to receive a postponed call from a scheduler;

wherein said new entry point comprises: program code configured to compare said function priority level of said priority function with a current priority level of a computer operation;

program code configured to write function data to a data store and postpone execution of said priority function when said function priority level is less than said current priority level;

program code configured to call said function code when said function priority level is not less than said current priority level; and wherein said scheduler entry point comprises computer program code configured to obtain said function data from said data store and to call said function code.

12. The computer program code of claim 11, further comprising scheduler program code configured to call one or more postponed functions.

13. The computer program code of claim 12, further comprising database program code for managing a database of one or more postponed functions.

14. The computer program code of claim 12, further comprising a memory manager for managing memory allocation for said priority function.

15. The computer program code of claim 12, further comprising a signal manager operatively coupled to said scheduler program code.

16. The computer program product of claim 12, further comprising a timer manager operatively coupled to said scheduler program code.

* * * * *